*INVENTORS*
WALTER H. HOGAN
BY HUGUES BOURASSA
*ATTORNEY*

INVENTORS
WALTER H. HOGAN
BY HUGUES BOURASSA
ATTORNEY

United States Patent Office 2,756,609
Patented July 31, 1956

2,756,609

BALL FRICTION DRIVE

Walter H. Hogan, Olmsted Falls, and Hugues Bourassa, Warrensville Heights, Ohio, assignors to The Cleveland Pneumatic Tool Company, Cleveland, Ohio, a corporation of Ohio Application March 26, 1954, Serial No. 418,852

9 Claims. (Cl. 74—459)

This invention relates broadly to devices for translating rotary motion into axial or linear motion, but more particularly to that type of a device wherein balls cooperate with two relatively movable members for translating the rotary motion of one into the linear motion of the other.

In ball screw and nut mechanisms as well as in the conventional screw and nut constructions, the rate of axial travel of one of the members for a given rotary speed of the other is primarily governed by the pitch of the helical ball channels or screw threads respectively. In the case of ball screw and nut, the pitch of the helical ball channel is limited by the size of the balls, and in the conventional screw and nut construction the pitch of the thread is limited by the size of the screw threads required to carry the intended load. Thus, when axial motion of one of the members is required at a rate lower than that obtainable by the smallest possible pitch of either the ball channel or screw threads, the mechanism must be provided with a speed reducing means such as a gear train or the like, which increases the cost of manufacture as well as the size and weight of the unit.

It is therefore the main object of this invention to provide a device through which relatively high speed rotary motion of one driving member can be directly translated into extremely low speed linear motion of a driven member.

Another object of this invention is to produce a high speed rotary to low speed linear motion translating device including shaft and sleeve members, the device being self-contained within the sleeve member and capable of design for effective operation upon rotary motion of either members.

Another object of this invention is to produce such a device with motion transmitting balls interposed between the shaft and sleeve members of the device and caused to travel within a helical path upon rotary motion of one of said members for transmitting their resulting linear motion to the other member by frictional engagement with a smooth surface thereof.

Another object of this invention is to provide balls for transmitting motion from one driving to a driven member by a frictional engagement with a smooth surface of the latter and to provide adjustable means for controlling the extent of said frictional engagement.

These objects are accomplished by a construction free of complication and by an arrangement of parts resulting in a compact unit which is strong, durable and efficient.

Referring to the drawings in which like symbols designate coresponding parts throughout the several views.

Figure 1:
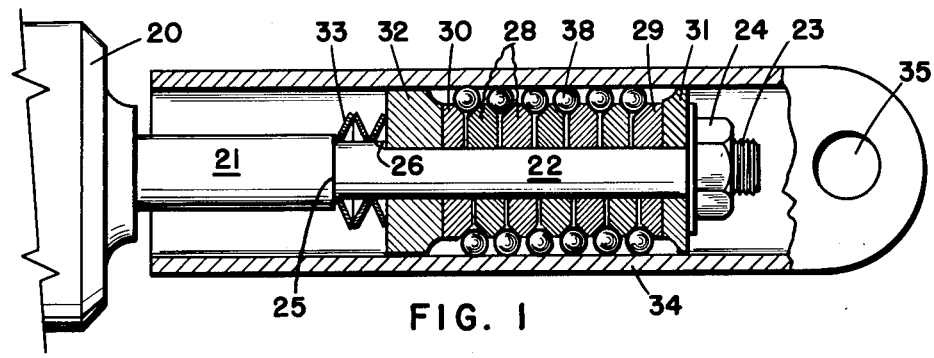
Figure 1 is a longitudinal sectional view of a unit embodying the invention.
Figure 2:
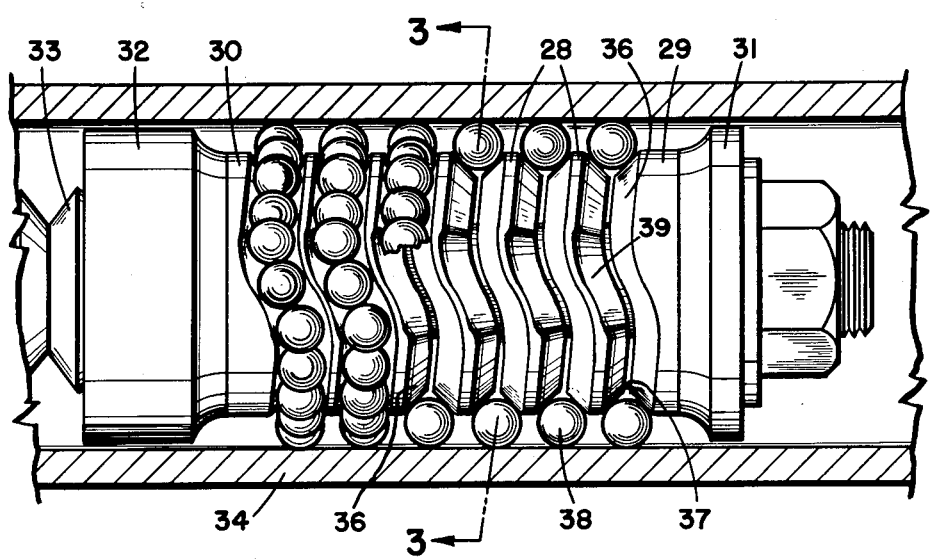
Figure 2 is an enlarged pictorial view of a portion of the unit shown in Figure 1.
Figure 3:
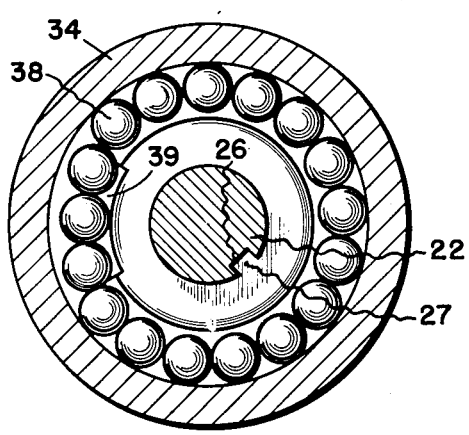
Figure 3 is a cross sectional view taken on line 3—3 in Figure 2.
Figure 7:
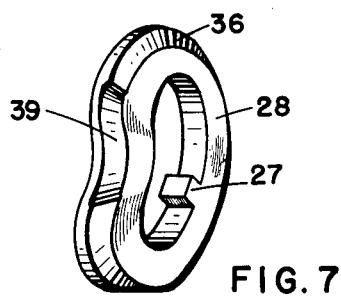
Figure 7 is a pictorial view of one of a series of disks used in the unit as shown in Figures 1 and 2.

In the embodiment of the invention shown in Figures 1 to 3, 20 represents a power source such as an electric motor or the like, having a shaft 21 rotatable thereby at a relatively high rate of speed, and a shaft extension 22 which can either be an integral part thereof or be attached thereto by any suitable means. The extension 22 constitutes the driving member of the unit, which has its free end threaded as at 23 to receive a washer and nut 24, while the other end is provided with an annular shoulder 25. A keyway 26 extends longitudinally of the driving shaft 22 in which are operatively fitted the keys 27 of a series of disks 28, mounted on the shaft for limited axial motion relative thereto and rotary motion therewith. The series of disks 28 is ended by terminal disks 29 and 30, the disk 29 abutting against an end washer 31, resting against nut 24, and the disk 30 abutting against one side of an end washer 32, while its other side engages one end of a spring means 33, the other end of which rests against shoulder 25. This spring means may be of any desired type, but preferably it comprises a series of coned-disk type springs known as Bellville washers, mounted as shown between shoulder 25 and terminal washer 32.

The driven member of this unit is formed by a tubular or sleeve-like member 34 having a terminal 35 through which it is adapted to be non-rotatably connected to the work or implement intended to be actuated thereby. The driven member 34 is formed with a smooth internal wall of a uniform diameter having closely fitted therein the two terminal washers 31 and 32, which act as sliding bearings for the sleeve to maintain it coaxially with the driving member 22.

Both external peripheral edges of the disks 28 as well as the opposed external peripheral edges of the end disks 29 and 30 are beveled at substantially 45 degrees or at such an angle calculated to best perform the function about to be described. Each disk 28 as well as the opposed faces of the end disks 29 and 30 are especially shaped, by stamping or otherwise, so that the peripheral inclined opposed edges 36 of each adjacent disk define together a V-shaped helical track or groove 37, all of the same pitch and configuration, thereby resulting in a series of parallel helical tracks located between the terminal disks 31 and 32, all of a width made adjustable by the limited axial movement of the disks on the driving member 22. Each track 37 is filled with balls 38, extending less than half way into the track and projecting radially therefrom into frictional engagement with the smooth inner wall of the driven member 34. The ends of each helical track 37 are connected by a crossover passageway 39 taking the form of a helix extending in the opposite direction of the helix of track 37 and of a depth gradually increasing from its ends towards the center to enable the balls to cross over while being spaced or at least out of operative engagement with the inner wall of the tube or driven member 34.

In the installation of the device, care must be exercised to always provide an axial clearance between the adjacent faces of the disks 28 so that the axial thrust exerted on the disks by the spring means 33 will always subject the balls 38 to a radial thrust against the inner wall of the driven member 34, the extent of which is adjustable by varying the compression of the spring means 33 through the nut 24. As rotation is imparted to the driving member 22 and consequently to the disks 28 and the disks 29 and 30, the balls 28 rotating within their respective helical tracks 37 will, for each revolution of the driving member 22, move axially an extent equal to the pitch of the helix of the tracks, which axial movement is transmitted to the driven member 34 by frictional engagement of the balls therewith. As each ball reaches one end of the helix of its track, it will enter the relatively deep crossover passageway 39 and thereby be relieved from operative engagement with the driven member and be free to travel to the other or starting end of the helix. Since the pitch of the helical track 37 may be made as small as desired without any interference from the size of the balls or the size of the tracks, it will be understood that the unit may be designed to translate the relatively high speed rotary motion of the driving member into extremely low speed linear motion of the driven member.

Figure 4:
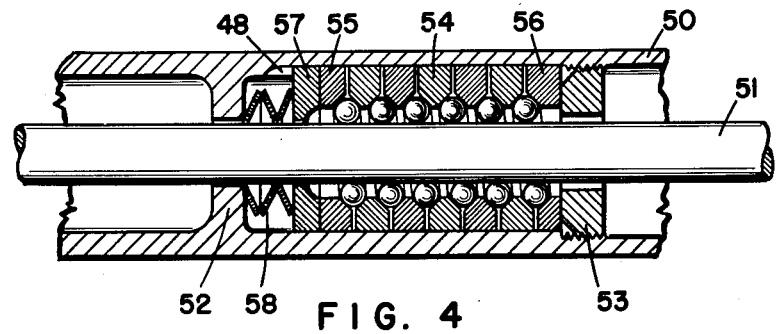
Figure 4 is a view similar to Figure 1 but showing an inverted method of drive.
Figure 5:
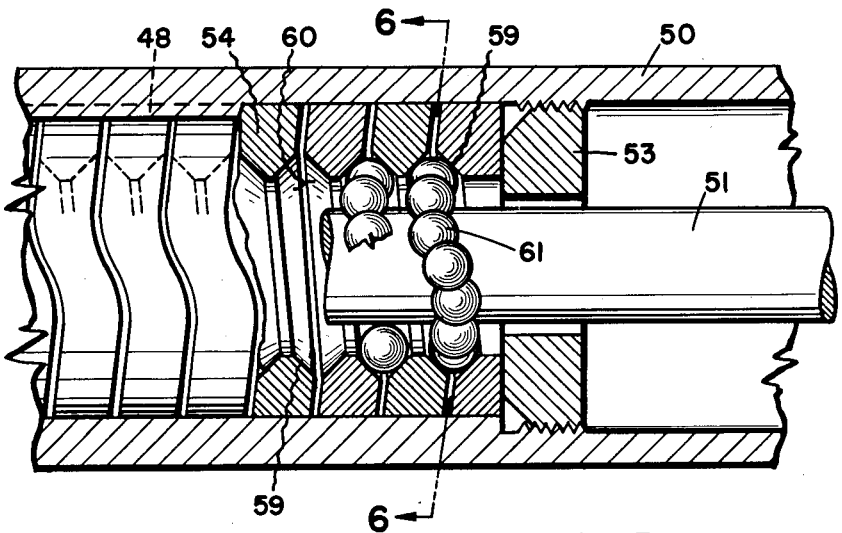
Figure 5 is an enlarged pictorial view of a portion of the unit shown in Figure 4.
Figure 6:
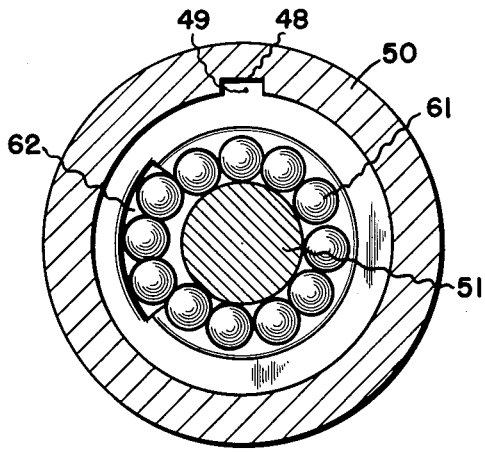
Figure 6 is a cross sectional view taken on line 6—6 in Figure 5.
Figure 8:
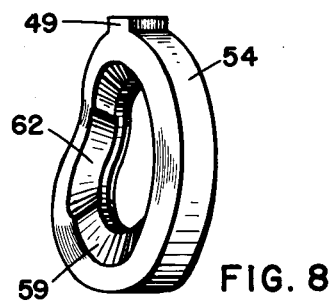
Figure 8 is a pictorial view of one of a series of disks used in the unit shown in Figures 4 and 5.

Figures 4 to 6, inclusive, show an inverted method of drive, wherein the driving member or sleeve 50 is connected to a source of rotary power, not shown, for rotation at a relatively high rate of speed, and the driven member of shaft 51 is non-rotatably connected to the work or element intended to be actuated thereby. The driving member 50 is provided with two longitudinally spaced internal annular shoulders 52 and 53, the shoulder 52 being an integral part of the driving member while the shoulder 53 takes the form of a nut threaded within the driving member. A keyway 48 extends longitudinally of the driving member 50 between shoulders 52 and 53, in which are operatively fitted the keys 49 of a series of disks 54, terminated by end disks 55 and 56, mounted within the driving member 50 for limited axial motion relative thereto and rotation therewith. The end disk 55 abuts against an end washer 57 which engages one end of a spring means or series of Bellville washers 58, while the other end of the spring rests against the annular shoulder 52.

Both peripheral internal edges of the disks 54, as well as the opposed peripheral internal edges of the end disks 55 and 56 are beveled substantially at 45 degrees or at such an angle calculated to best perform the function about to be described. Each disk 54 as well as the opposed faces of the end disks 55 and 56 are especially shaped, by stamping or otherwise, so that the inner peripheral inclined opposed edges 59 of each adjacent disk, define together a V-shaped helical track 60, all of the same pitch and configuration, thereby resulting in a series of parallel helical tracks located between the terminal disks 55 and 56, all of a width made adjustable by the limited axial movement of the disks within the driving member 50. Each track 60 is filled with balls 61 extending less than half way into the track and projecting radially therefrom into frictional engagement with the smooth outer surface of the driven member 51. The ends of each helical track 60 are connected by a crossover passageway 62 taking the form of a helix extending in the opposite direction of the helix of the track 60 and of a depth gradually increasing from its ends towards the center to enable the balls to cross over while being spaced or at least out of operative engagement with the shaft or driven member 51.

In this modified construction, care must also be exercised to always provide an axial clearance between the adjacent faces of the disks 54 so that the axial thrust exerted on the disks by spring means 58 will always subject the balls 61 to an inward radial thrust against the driven member 51, the extent of which is adjustable by varying the compression of spring means 58 through the nut 53. As rotation is imparted to the driving member 50 and consequently to the disks 54 and end disks 55 and 56, the balls 61 rotating within their respective helical tracks 60 will, for each revolution of the driving member 50, move axially an extent equal to the pitch of the helix of the tracks, which axial movement is transmitted to the driven member 51 by frictional engagement of the balls therewith. As each ball reaches one end of the helix of its track, it will enter the relatively deep crossover passageway 62 and thereby be relieved from operative engagement with the driven member and be free to travel to the other or starting end of the helix. Since the pitch of the helical tracks 60 may be made as small as desired without any interference from the size of the balls or the size of the tracks, it will be understood that the unit may be designed to translate the relatively high rotary speed of the driving member into the extremely low speed linear motion of the driven member.

In practice, material hardness of the operative elements is to be as great as conveniently possible with the usual heat treating practices, thereby limiting the rolling friction of the balls within their tracks to a minimum, which friction, of course, must be overcome by sufficient driving power of the power source. The sliding friction resulting from the radial thrust of the balls against the driven member is, of course, greater than the rolling friction, thereby enabling traction without slippage of the balls with the driven member to transmit linear motion thereto. The degree of sliding friction which is adjustable by varying the compression of spring means 33 or 58 determines the load under which the driven member may be moved axially without slippage, and consequently determines the load capacity of the unit.

From the foregoing, it will be understood that the invention provides a high speed rotary to low speed linear motion translating device self-contained within the external or tubular member thereof and constitutes a relatively simple and light device, economical of manufacture, and of general superiority and serviceability.

We claim:

1. In a motion translating device, a rotary driving shaft member, an axially movable driven cylinder member, helically grooved means connected to said driving shaft member for rotation therewith, ball means circulating within the groove of said first means upon rotation thereof, and means forcing said ball means when circulating within said groove into frictional engagement with a smooth wall of said driven cylinder member for frictionally transmitting axial motion thereto to an extent proportional to the pitch of the helix of said groove.

2. In a motion translating device, a rotating driving shaft member, an axially movable driven cylinder member, helically grooved means carried by said driving shaft member for rotation therewith, a crossover passageway connecting the ends of the helical groove of said means, a series of balls circulating within said groove and through said passageway, and means forcing said balls when circulating within said groove into frictional engagement with a smooth surface of said driven cylinder member for frictionally transmitting axial motion thereto to an extent proportional to the pitch of the helix of said groove.

3. In a motion translating device, an axially fixed rotary driving shaft member and a non-rotatable axially movable driven cylinder member, one coaxially within the other, an axially fixed helical track between said members rotatable with said driving shaft member, ball means within said track, and means forcing said ball means into frictional engagement with a smooth surface of said driven member for transmitting axial motion thereto by virtue of the helix of said track upon its rotation with said driving shaft member.

4. In a motion translating device, an axially fixed rotary driving member and a non-rotatable axially movable driven member, one coaxially within the other, a plurality of disks between said members carried by said driving member for rotation therewith, a helical track defined by opposed surfaces of any two adjacent disks, balls partway within said tracks frictionally engaging a smooth surface of said driven member for transmitting axial motion thereto by virtue of the helix of said tracks upon rotation of said disks with said driving member, and force exerting means effecting said frictional engagement.

5. In a motion translating device, an axially fixed rotary driving member and a non-rotatable axially movable driven member, one coaxially within the other, a plurality of disks between said members carried by said driving member for rotation therewith and capable of limited axial movement thereon relative to each other, substantially a V-shaped helical track defined by opposed surfaces of any two adjacent disks, balls partway within said tracks radially retained therein by said driven member to maintain said disks in longitudinally spaced relationships, and spring means active on said disks to urge said balls radially relative to said tracks into frictional engagement with said driven member for transmitting axial motion thereto by virtue of the helix of said tracks upon rotation of said disks with said driving member.

6. In a motion translating device, a non-rotatable axially movable cylinder having an axially fixed rotatable shaft coaxially therein, a plurality of substantially V-shaped helical tracks rotatable with said shaft within said cylinder, means rendering the width of said tracks adjustable, balls partway within said tracks radially retained therein by said cylinder, and spring means tending to reduce the width of said tracks and urge said balls radially into frictional engagement with said cylinder for transmitting axial motion thereto by virtue of the helix of said tracks upon their rotation with said shaft.

7. In a motion translating device, a non-rotatable axially movable cylinder having an axially fixed rotatable shaft coaxially therein, a substantially V-shaped external annular track on said shaft rotatable therewith within said cylinder, said track shaped helically with offset ends, a crossover passageway connecting the ends of said track, means rendering the width of said track adjustable, balls adapted to circulate within said track through said passageway and extending radially therefrom into engagement with said cylinder, and spring means tending to reduce the width of said track and urge said balls radially outward into frictional engagement with said cylinder for transmitting axial motion thereto by virtue of the helix of said track upon its rotation with said shaft.

8. In a motion translating device, an axially fixed rotatable one piece cylinder having a non-rotatable axially movable shaft coaxially therein, a plurality of detachable substantially V-shaped helical tracks rotatable with said cylinder over said shaft, means rendering the width of said tracks adjustable, balls partway within said tracks radially retained therein by said shaft, and spring means tending to reduce the width of said tracks and urge said balls radially into frictional engagement with said shaft for transmitting axial motion thereto by virtue of the helix of said tracks upon their rotation with said cylinder.

9. In a motion translating device, an axially fixed rotatable one piece cylinder having a non-rotatable axially movable shaft coaxially therein, a detachable substantially V-shaped internal annular track on said cylinder rotatable therewith over said shaft, said track shaped helically with offset ends, a crossover passageway connecting the ends of said track, means rendering the width of said track adjustable, balls adapted to circulate within said track through said passageway and extending radially therefrom into engagement with said shaft, and spring means tending to reduce the width of said track and urge said balls radially inward into frictional engagement with said cylinder for transmitting axial motion thereto by virtue of the helix of said track upon its rotation with said cylinder.

References Cited in the file of this patent

UNITED STATES PATENTS

| | | |
|---|---|---|
| 2,350,538 | Selves | June 6, 1944 |
| 2,441,168 | Richardson | May 11, 1948 |